(12) United States Patent
Flandre et al.

(10) Patent No.: US 8,760,070 B2
(45) Date of Patent: Jun. 24, 2014

(54) LIGHTING AND/OR INDICATING DEVICE EQUIPPED WITH A DEVICE FOR REGULATING THE LUMINOUS FLUX FOR A HALOGEN BULB

(75) Inventors: Loic Flandre, Bobigny (FR); Stephane Richard, Bobigny (FR)

(73) Assignee: Valeo Vision, Bobigny (FR)

( * ) Notice: Subject to any disclaimer, the term of this patent is extended or adjusted under 35 U.S.C. 154(b) by 887 days.

(21) Appl. No.: 11/048,537

(22) Filed: Feb. 1, 2005

(65) Prior Publication Data

US 2005/0169005 A1 Aug. 4, 2005

(30) Foreign Application Priority Data

Feb. 2, 2004 (FR) ...................................... 04 00959

(51) Int. Cl.
*H05B 41/16* (2006.01)

(52) U.S. Cl.
USPC ........... 315/247; 315/307; 315/291; 315/224; 315/209 R

(58) Field of Classification Search
USPC ......... 315/247, 246, 291, 307, 49–59, 209 R, 315/224; 362/362
See application file for complete search history.

(56) References Cited

U.S. PATENT DOCUMENTS

| | | | | |
|---|---|---|---|---|
| 3,633,195 A * | 1/1972 | Menzel | ........................... | 340/662 |
| 3,814,947 A * | 6/1974 | Friedman | ......................... | 307/41 |
| 4,104,715 A * | 8/1978 | Lawson, Jr. | ...................... | 363/37 |
| 4,253,045 A * | 2/1981 | Weber | ........................... | 315/210 |
| 5,432,500 A * | 7/1995 | Scripps | ......................... | 340/628 |
| 5,534,755 A * | 7/1996 | Deavenport et al. | ........... | 315/307 |
| 5,600,208 A * | 2/1997 | Katou et al. | ..................... | 315/70 |
| 5,663,875 A | 9/1997 | Cassese et al. | | |
| 5,675,220 A * | 10/1997 | Dault et al. | ..................... | 315/77 |
| 5,848,054 A * | 12/1998 | Mosebrook et al. | ........... | 370/226 |
| 6,072,284 A * | 6/2000 | Lin | .............................. | 315/307 |
| 6,242,872 B1 * | 6/2001 | Ha | ................................ | 315/293 |
| 6,380,683 B1 * | 4/2002 | Kahn | .............................. | 315/56 |
| 6,392,364 B1 * | 5/2002 | Yamamoto et al. | ........... | 315/291 |
| 6,445,133 B1 * | 9/2002 | Lin et al. | ......................... | 315/57 |
| 6,476,559 B2 * | 11/2002 | Rapp | .............................. | 315/88 |
| 6,531,825 B1 * | 3/2003 | Iacob | ............................. | 315/105 |
| 6,531,834 B2 * | 3/2003 | Haeusser-Boehm et al. . | | 315/291 |
| 6,583,570 B1 * | 6/2003 | Ito et al. | ......................... | 315/82 |

(Continued)

FOREIGN PATENT DOCUMENTS

| | | |
|---|---|---|
| EP | 0 401 911 | 12/1990 |
| EP | 0 735 801 | 3/1996 |

(Continued)

OTHER PUBLICATIONS

French Search Report dated Sep. 14, 2004.

(Continued)

*Primary Examiner* — Tuyet Thi Vo
(74) *Attorney, Agent, or Firm* — Locke Lord LLP

(57) ABSTRACT

The present invention relates to a lighting and/or indicating device, such as a vehicle headlamp, equipped with at least one halogen bulb, wherein it comprises a switch-mode power supply device for supplying power to the halogen bulb, said switch-mode power supply device comprising means for regulating the luminous flux provided by the halogen bulb and being installed close to the halogen bulb so as to minimize electromagnetic interference and dispersion of the supply voltage at the terminals of the halogen bulb.

16 Claims, 4 Drawing Sheets

(56) References Cited

U.S. PATENT DOCUMENTS

| | | | |
|---|---|---|---|
| 6,597,130 B2 * | 7/2003 | Lee et al. | 315/294 |
| 6,914,394 B2 * | 7/2005 | Weirich | 315/291 |
| 6,958,584 B2 * | 10/2005 | Nakamura et al. | 315/360 |
| 7,083,309 B2 * | 8/2006 | Chan et al. | 362/429 |
| 7,202,614 B2 * | 4/2007 | Bayat et al. | 315/324 |
| 2002/0014866 A1 * | 2/2002 | Cooper et al. | 315/291 |
| 2002/0047533 A1 | 4/2002 | Fushimi et al. | |
| 2002/0181260 A1 * | 12/2002 | Chou et al. | 363/95 |
| 2004/0090190 A1 * | 5/2004 | Shields | 315/291 |
| 2006/0146527 A1 * | 7/2006 | VanderSchuit | 362/228 |
| 2008/0007180 A1 * | 1/2008 | Kesterson | 315/82 |
| 2008/0080187 A1 * | 4/2008 | Purinton | 362/294 |
| 2008/0129176 A1 * | 6/2008 | Jigamian | 313/113 |

FOREIGN PATENT DOCUMENTS

| | | |
|---|---|---|
| EP | 0735803 | 10/1996 |
| EP | 1 367 863 A2 | 12/2003 |
| EP | 1 367 863 A3 | 12/2003 |

OTHER PUBLICATIONS

Lazar's Power Electronics Guide; SMPS Switching power Supply Design Basics: Circuits, Schematics, PCBs, Electrical Engineering Reference, Software and Other Info; Copyright 2003, 2007-2010 Lazar Rozenblat.

* cited by examiner

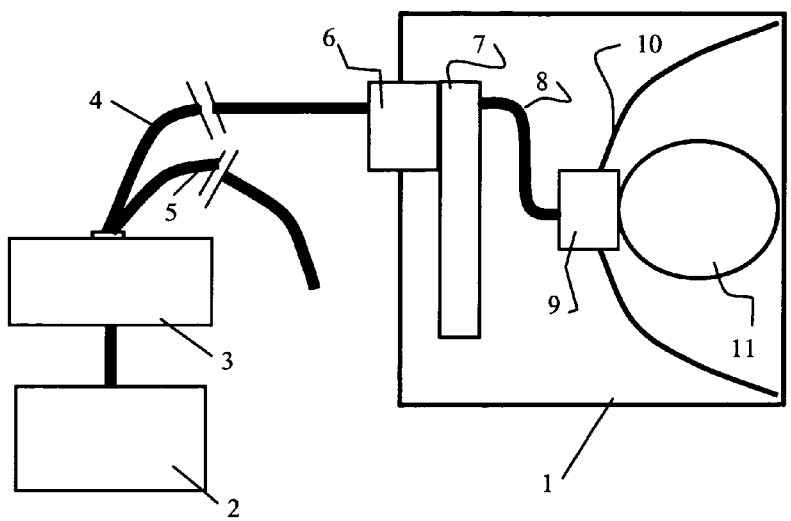
Figure 1
Figure 2
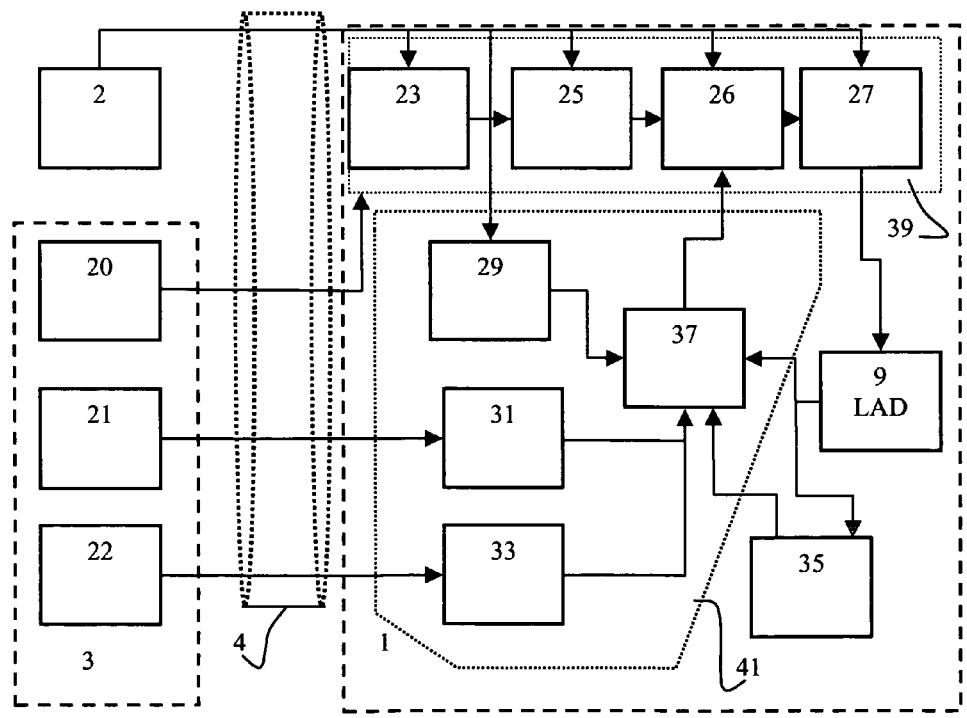

LIGHTING AND/OR INDICATING DEVICE EQUIPPED WITH A DEVICE FOR REGULATING THE LUMINOUS FLUX FOR A HALOGEN BULB

FIELD OF THE INVENTION

The present invention relates to a vehicle lighting and/or indicating device, such as a vehicle headlamp, which includes a device for regulating the luminous flux for a halogen bulb. It also relates to a vehicle lighting and/or indicating system equipped with a lighting and/or indicating device as defined above.

BACKGROUND OF THE INVENTION

In the prior art, a description has already been given of electrical power supply converters which, as a function of commands entered via an on-board computer or directly via switches on the instrument panel, place a halogen bulb in a particular operating condition.

However, since the first converters appeared, the electronic environment inside the vehicle has changed somewhat and thus a certain number of problems or requirements have arisen which the present invention aims to solve.

It was found that the service life of the halogen bulbs used in the headlamp and/or indicator lamp was on average much shorter than the service life indicated by halogen bulb manufacturers. This is because the operating voltage of the alternators used in vehicles has gradually increased.

Furthermore, some xenon bulbs in particular shared the same connection cables with the halogen bulbs, and these connection cables had to be of low electrical impedance in order to ensure correct electrical behavior.

This means that the voltage applied to the terminals of the halogen bulbs was often greater than the optimal voltage which makes it possible to ensure the reliability of halogen bulbs.

Moreover, the luminous flux of halogen bulbs closely depends on the voltage applied thereto. This means firstly that the luminous flux becomes too great on account of the increase in the source voltage, in particular in indicating devices such as a flashing light or a day running time indicator lamp, and on the other hand that irregularities in the luminous flux occur on account of the mismatched impedance due to the cables, and this is prejudicial both to the lighting and/or indicating comfort and also to the increase in the number of disadvantages due to parasitic radiofrequency radiation (EMC).

A number of solutions are proposed in the prior art.

According to a first solution, use is made of a cable for connecting the converter to the bulb, which cable has high impedance in order to cause a voltage drop due to losses. This results in a reduction in the 10 voltage applied to the halogen bulb, and this is beneficial to the service life thereof. Nevertheless, a connection cable with high impedance is expensive and must be avoided in mass production.

According to a second solution, use is made of a halogen bulb which has a longer nominal service life than the nominal service life of the bulbs used to date. Such a measure is essentially achieved by using batches of halogen bulbs in respect of which the constraints which provide a longer service life have been increased. This involves a significant extra cost and must be avoided in mass production.

According to a third solution, use is made of a power supply converter for supplying power to each halogen bulb based on the principle of a switch-mode power supply in respect of which the output voltage can be regulated independently of the supply voltage. However, such a solution introduces a switch in the current which flows on the power supply cable which connects the output of the converter to the bulb, and this results in electromagnetic interference which increases the risk of not meeting EMC standards in motor vehicles.

Finally, all of these solutions have the drawback of producing a mediocre yield on account of electrical losses in particular on the power supply cables. Moreover, the dispersion of the impedances of the connection cables and the difference in their lengths, depending on the relative situation of the control unit and of each headlamp or light, entail the risk that the voltage applied to the right headlamp or light will be different from the voltage applied to the left headlamp or light.

SUMMARY OF THE INVENTION

The present invention overcomes these drawbacks of the prior art. It relates to a lighting and/or indicating device, such as a motor vehicle headlamp, equipped with at least one halogen bulb. According to the invention, the lighting and/or indicating device comprises a switch-mode power supply device for supplying power to the halogen bulb, the switch-mode power supply device comprising means for regulating the luminous flux provided by the halogen bulb and being installed as close to the halogen bulb as possible so as to minimize electromagnetic interference and dispersion of the supply voltage at the terminals of the halogen bulb.

The invention also relates to a vehicle lighting and/or indicating system comprising at least one lighting and/or indicating device as defined briefly above.

Other features and advantages of the present invention will be better understood with the aid of the description and the drawings, in which:

BRIEF DESCRIPTION OF THE DRAWINGS

FIG. 1 schematically shows a headlamp according to the invention, equipped with a device for regulating the luminous flux for a halogen bulb;

FIG. 2 shows a block diagram of a regulating device according to the invention;

DESCRIPTION OF THE PREFERRED EMBODIMENTS

Figure 3:
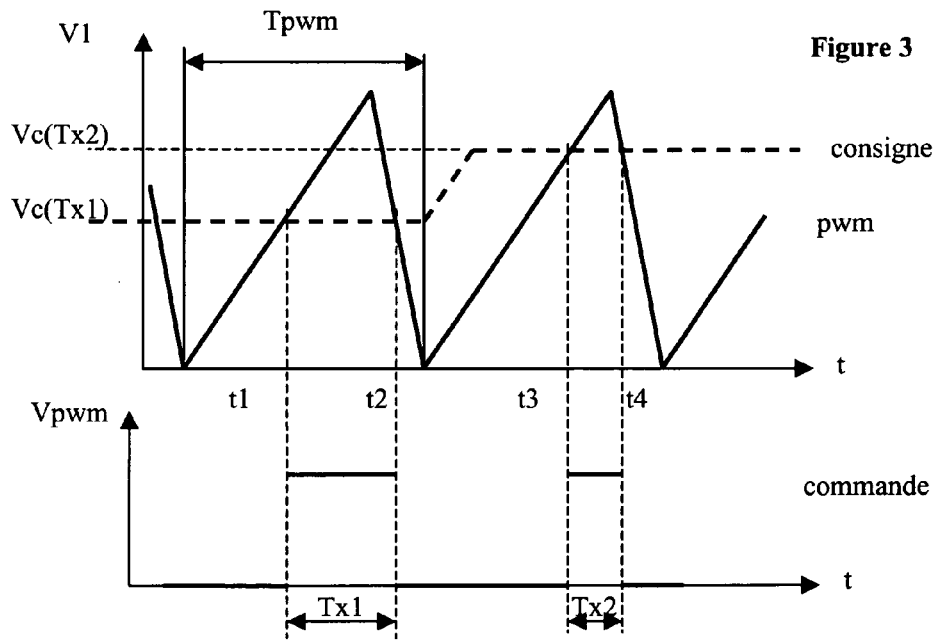
FIGS. 3 and 4 show graphs for explaining the mode of operation of one particular embodiment of the device of FIG. 2.

FIG. 1 schematically shows a headlamp according to the invention, equipped with a device for regulating the luminous flux for a halogen bulb. In the case of a vehicle headlamp, a second side headlamp is provided so as to form a vehicle lighting and/or indicating system.

The headlamp 1 comprises, enclosed within a suitable casing, a halogen bulb 11 placed in a given geometrical position with respect to a reflector 10. The bulb 11 is mounted by its cap 12 on a connector 9 secured to the casing and connected to an electronic circuit board 7 via power supply cable 8. The electronic circuit board 7 is connected to another power supply cable 4 by means of a connector 6. An on-board network 2, on which an alternator (not shown) feeds and on which an electrochemical battery (not shown) is located, is connected to a control unit 3 which is connected to the headlamp 1 via a power supply cable 4 and to the second headlamp (not shown) via a cable 5.

According to the invention, the current flowing on the power supply cable 4 does not comprise any adverse component from the electromagnetic point of view nor any weak pulsed currents. Unlike in the prior art, according to the invention all the work which makes it possible to regulate the luminous flux of the halogen bulb is carried out as close to the actual halogen bulb as possible.

Figure 5:
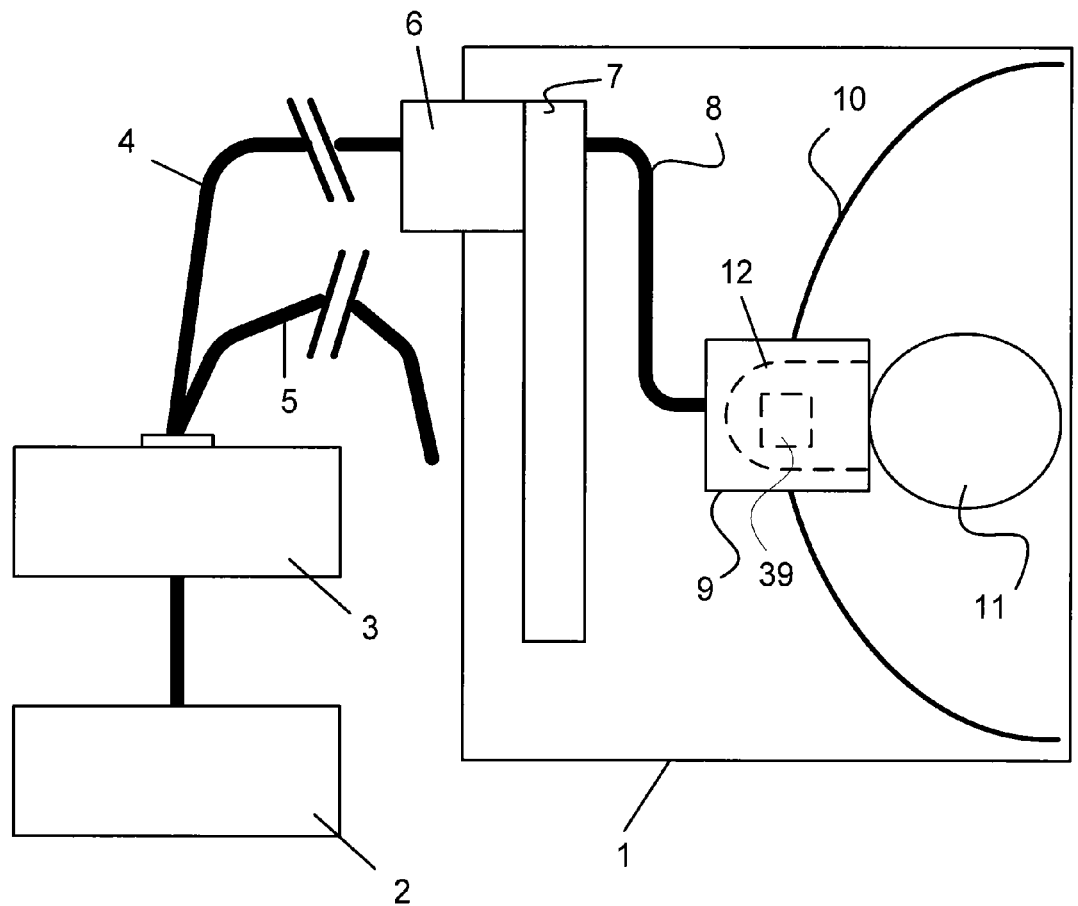
FIG. 5 schematically shows a headlamp according to an embodiment of the invention.

In one embodiment, as demonstrated in FIG. 5, the flux-regulating device 39 is integrated in the cap 12 of the halogen bulb 11.

Figure 6:
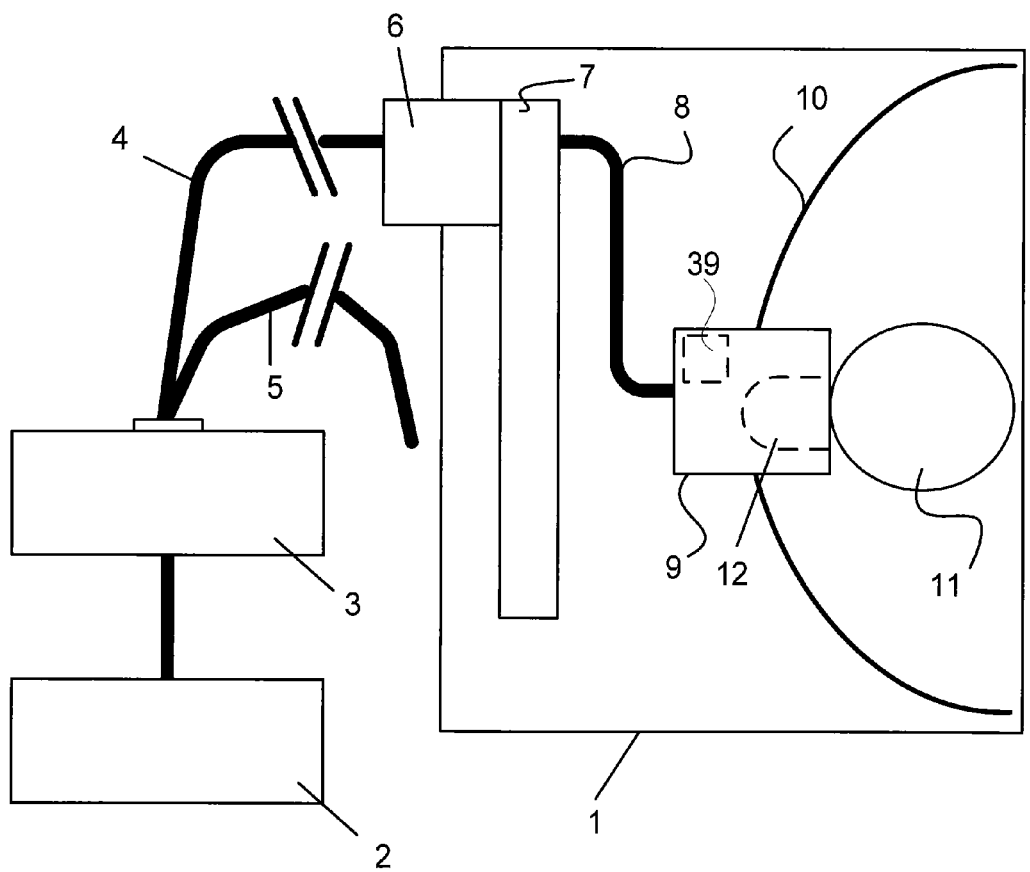
FIG. 6 schematically shows a headlamp according to an embodiment of the invention.

In another embodiment, as demonstrated in FIG. 6, the flux-regulating device 39 is integrated in the connector 9 of the headlamp 1 on which the halogen bulb 11 is mounted.

In another embodiment, the flux-regulating device is integrated in the connector of the headlamp to which there is connected the standard cable for supplying power to the headlamp.

In another embodiment, the flux-regulating device is integrated in the connector of the standard cable for supplying power to the headlamp at its connection to the headlamp.

In another embodiment, the flux-regulating device is integrated in the standard cable for supplying power to the headlamp by being installed on the insulating substrate of the cable, such as the insulating sheath of a traditional cable, as already described in a solution for installing an electronic circuit on a connection cable in patent EP-A-0 719 664.

These arrangements in particular mean that, except for the possible problem of losses, even the problem of matching the impedance of the power supply cable is solved since the electrical quantity which reaches the halogen bulb itself can be regulated in a simple manner.

FIG. 2 shows the block diagram of a regulating device according to the invention. In FIG. 2, the same elements bear the same reference numbers and will not be described again.

The headlamp 1 has been shown with its external cable 4 for connection to the control unit 3. The on-board network 2 is connected to a device 39 for switching a supply current to a controlled supply voltage.

In particular, such a device may be constructed by applying the teachings of the document EP-B1-0 735 801. In one particular embodiment, the device 39 comprises a voltage regulator 23 which then supplies power to a fixed-frequency oscillator 25. The output of the oscillator circuit 25 is connected to a first input of a circuit 26 which generates a pulse width modulation signal PWM, the duty factor of which depends on a setpoint applied to a second input of the generator circuit 26 by a reference circuit 41 which generates such a setpoint as a function of an image of an electrical quantity representative of the luminous flux of the halogen bulb produced by a circuit 35 for generating an image of the voltage at the terminals of at least one halogen bulb 11. The luminous flux is a known characteristic of bulbs, and it goes without saying that any other data which represents the optical performance of the bulb/characterizes the radiation emitted by the bulb could also be used.

The wave produced by the circuit 26 is transmitted to the control input of a switch-mode transistor circuit 27 which is moreover connected to the power supply source 2, the voltage of which will be switched in synchronism with the PWM wave applied to the first input of the switch-mode transistor circuit 27. As already mentioned, such a circuit may be based on the patent EP-B1-0 735 803.

The voltage generated is then applied to the halogen bulb 11 (in FIG. 1) via its connector 9.

The regulating loop is then formed by using a third circuit 35 for generating an image of an electrical quantity representative of the luminous flux of at least one halogen bulb.

In one embodiment, the electrical quantity is formed by measuring the electrical voltage at the terminals of the halogen bulb.

In another embodiment, the electrical quantity is formed by measuring the electrical current through the halogen bulb. To this end, the circuit (not shown) for measuring the electrical current through the halogen bulb measures the voltage at the terminals of a shunt resistor (not shown) which is placed between electrical ground and the corresponding terminal of the halogen bulb.

In another embodiment, the electrical quantity is formed by a tabulated reconstruction of the luminous flux of the halogen bulb as a function of its supply voltage. The table recorded in a memory (not shown) of the circuit 35 is addressed by a special circuit for measuring at any given point in time the supply voltage delivered on the device of the invention, as close to the halogen bulb as possible. The value read in the memory addressed in this way is then taken as a regulating value by the circuit 41.

In one particular embodiment, the reference circuit 41, which generates a setpoint for regulating an electrical quantity such as the voltage at the terminals of the halogen bulb, comprises a circuit 29 for generating a reference voltage Vref which is a given function of the instantaneous supply voltage Val measured as close to the halogen bulb as possible, in particular at a point where the voltage variations produced by the mismatched impedances of the connection cables no longer have any effect.

The reference circuit 41 also comprises a circuit for generating a DC reference voltage 37 which serves to control the circuit 26 for generating a pulse-width-modulated wave PWM. This circuit applies a given function f1( ) which makes it possible to calculate a DC reference voltage level Vref:

Vref=f1(Val, Vsortie);

which uses as parameters the instantaneous measurement of the supply voltage Val as close to the halogen bulb as possible and the image Vsortie of a quantity representative of the luminous flux of the halogen bulb, such as the voltage measured at the terminals of the halogen bulb. The function f1( ) may be implemented in programmed form on a microcontroller or on a signal processing unit or even in microcabled form using a programmable logic array.

In another embodiment, the function f1( ) may be implemented by analogue electronic means, with a purely analogue circuit, in particular on the basis of operational amplifiers.

Figure 4:
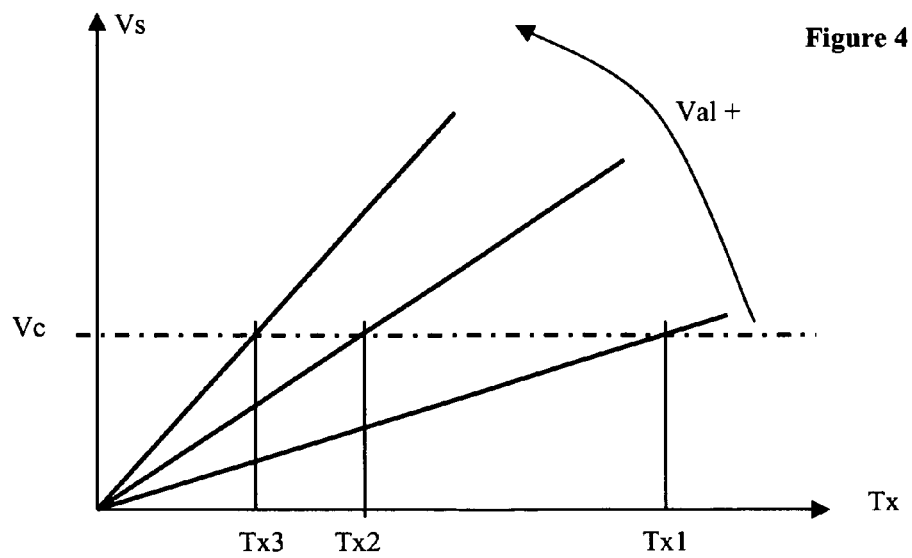

The regulating loop is thus closed and the device of the invention can operate while affording the abovementioned advantages. Reference will now be made to FIGS. 3 and 4 in order to provide details of this mode of operation.

FIG. 3 shows:
  on the upper time graph: in continuous line a waveform of a pulse width modulation carrier "pwm" and in dashed line a pulse width setpoint voltage "setpoint";
  on the lower time graph: the result of the pulse width modulation "control" of the setpoint voltage "setpoint" on the carrier "pwm". As a variant, the modulation may be a frequency modulation.

The principle of pulse width modulation is as follows: a comparator receives on a first input terminal the waveform "pwm" shown in FIG. 3 and on a second input terminal a pulse width setpoint voltage shown in FIG. 3. The output waveform is shown in the lower graph of FIG. 3 and is applied as a control voltage or reference voltage for the switch-mode transistor circuit 27 (FIG. 2).

The waveform "pwm" has been shown in the form of a triangular wave with two oblique fronts. This wave has the special feature that it has a fixed frequency determined by the period Tpwm but a phase which varies at the same time as the setpoint. Thus, in the case of FIG. 3, when the voltage "setpoint" passes from the value V(T×1) to the value V(T×2), which is higher, the temporal width of the pulse "control" produced by the comparator contained in the circuit 26 is reduced (lower graph in FIG. 3).

This means that the voltage applied by the switch-mode transistor circuit 27 to the bulb 9 is reduced when the setpoint passes from the value V(T×1) to the value V(T×2), which is higher.

In another embodiment, the pulse width modulation principle is replaced by a frequency modulation principle in which the parameter for controlling the instantaneous value of the voltage applied is formed by a modulation phase and/or frequency and where appropriate by a modulation amplitude.

FIG. 4 shows a graph on which the optimal supply voltage of the halogen bulb, Vc, is shown in dash-dotted line. A law of the type Vs=Val×Tx is used to regulate the mean output voltage Vs applied by the switch-mode transistor circuit 27 to the halogen bulb 9.

Other laws which take account of a possible linearity defect of the halogen bulb, depending on its mode of operation in particular, or of a linearity defect in the value of the output voltage as a function of the control are programmed.

To this end, FIG. 2 shows a control unit 3 which is connected via the cable 4 to the circuit 39 for switching a supply current. The control unit makes it possible to control the lighting functions produced by the headlamp 1 by virtue of a control interpreter module 20 which makes it possible in particular to manage the mode of operation of the halogen bulb such as a start-up mode or a sustain mode and other functions which will be determined below.

According to the invention, the regulating device 7 firstly measures the supply voltage available from the on-board network 2 by virtue of the circuit 29. It then receives an image of the quantity representative of the luminous flux, in this case the voltage measured by the circuit 35. Using the circuit 37, which carries out the aforementioned pre-programmed function f1( ), it deduces therefrom a setpoint voltage applied to the circuit 26 in which there is located the above-described comparator of the pulse width modulator. The latter then applies the correct switching to the circuit 27 so that a regulated voltage Vc (FIG. 4) is applied to the bulb.

In one embodiment, the reference circuit 41 comprises a circuit 31 which generates a reference voltage for a secondary function. The circuit 31 is controlled by an automatic device 21 of the control unit 3 which determines a secondary function. Depending on the circumstances, such a secondary function is expressed by an increase or a reduction in the output voltage of the switch-mode transistor circuit 39. This variation is implemented by consequently modifying the controlled duty factor Tx and therefore the reference voltage produced at the output of the circuit 37, for example according to the law shown in FIG. 4, by increasing or reducing the target voltage Vc shown in dash-dotted line.

In one embodiment, the secondary functions carried out are selected from the "AFS" functions for adapting the front lighting of the vehicle.

In one embodiment, the functions of adapting the front lighting of the vehicle are selected from one of the following functions:

control of the dynamic dipped beam lighting mode during a turn;
control of the fixed dipped beam lighting mode during a turn;
control of the sidelights lighting mode;
control of the full beam lighting mode;
control of the high-mount light lighting mode;
control of the bad weather lighting mode.

In one embodiment, the secondary functions carried out are based on a second mode of operation of the halogen bulb, in particular for a single-filament bulb, which is implemented by applying to the bulb a regulated and predetermined voltage, current and/or current ripple.

This is because, although halogen bulbs with two or more filaments exist, bulbs having a single filament are less expensive. The regulating device makes it possible to apply an electrical quantity, in particular voltage or current and waveform, which makes it possible to produce novel optical features depending on the features of the bulb. In particular, it is possible to obtain pulsed operation, for example in order to make the headlight reduce or increase the luminous flux, to modify the radiation pattern and also to modify a colorimetric characteristic such as the "colour temperature" of the luminous flux, with a single simple halogen bulb.

In one embodiment, the reference circuit 41, which generates a setpoint for regulating an electrical quantity such as the voltage at the terminals of the halogen bulb, comprises a circuit 33 which generates a reference voltage so as to take account of the instantaneous speed of the vehicle. To this end, the control unit comprises a means 22 for transmitting to the regulating device a vehicle speed information item. Preferably, the higher the speed of the vehicle, the greater the luminous flux. As above, this additional function is implemented by increasing the target voltage Vc of FIG. 4, which is achieved by reducing the reference voltage so as to increase the duty factor produced by the circuit 26.

In one embodiment, the reference circuit 41, which generates a setpoint for regulating an electrical quantity such as the voltage at the terminals of the halogen bulb, comprises a circuit which generates a reference voltage so as to take account of the temperature of the bulb.

To this end, the device of the invention cooperates with a temperature sensor for sensing the temperature of the halogen bulb, and thus as described above modifies the target voltage Vc so as to limit the variation in the luminous flux caused by the heating of the bulb, or conversely caused by a temperature which is too low during start-up of the bulb. In another embodiment, the temperature sensor is replaced by a means of estimating the temperature which is based on measuring an electrical parameter such as a variation in the current through the bulb or measuring the ambient temperature of the headlamp.

In one embodiment, the reference circuit 41, which generates a setpoint for regulating an electrical quantity such as the voltage at the terminals of the halogen bulb, comprises a circuit which generates a reference voltage so as to take account of the degree of ageing of the bulb.

To this end, the circuit 41 cooperates with a first memory which records the total of the durations of use of the bulb so that a second memory containing a table of the target voltages which produce an optimal luminous flux depending on the degree of ageing of the bulb can be read. The value read from the second memory is then applied as a central value to the circuit 37 for generating the reference voltage, which may however be modified in particular in the event of variations in the measurement of the supply voltage or other functions mentioned above.

In one embodiment, the reference circuit comprises a circuit 37 for generating a reference voltage which serves as a setpoint for the circuit 26 which generates a pulse width modulation signal PWM which implements a function f1( ), of the form Vref=f1(Val, Vsortie), which depends on the parameters produced by at least one of the circuits such as the circuit 29 for measuring the supply voltage Val, the circuit 31 which generates a reference voltage for a secondary function, the circuit 33 which generates a reference voltage so as to take account of the instantaneous speed of the vehicle, the circuit which generates a reference voltage so as to take account of the temperature of the bulb, and the circuit which generates a reference voltage so as to take account of the degree of ageing of the bulb.

In one embodiment, the wave produced by the circuit 26 is transmitted to the control input of a switch-mode transistor circuit 27 which is moreover connected to the power supply source 2, the voltage of which will be switched in synchronism with the wave PWM applied to the first input of the switch-mode transistor circuit 27.

Of course, the invention applies to an indicating system in which the halogen bulb is mounted in an indicator lamp. The same elements as those of FIGS. 2 to 4 are then used in a similar manner.

The invention therefore relates to a vehicle lighting and/or indicating system, including a regulating device as defined above. The system comprises one regulating device associated with each headlamp or light.

Such a lighting and/or indicating system comprises means for activating a second lighting and/or indicating function for the same halogen bulb, in particular of the single-filament type.

What is claimed is:

1. A lighting device, comprising: at least one halogen bulb, wherein each halogen bulb includes a cap; a connector for each halogen bulb, wherein the cap of each halogen bulb is mounted on each connector; and a switch-mode power supply device for each halogen bulb, each switch-mode power supply device being adapted to supply power to each halogen bulb and to regulate an output voltage from the switch-mode power supply device independent of a supply voltage to the switch-mode power supply device, each switch-mode power supply device comprising a regulating circuit for regulating the luminous flux provided by each halogen bulb, wherein each switch-mode power supply device is configured to minimize electromagnetic interference and dispersion of the supply voltage at the terminals of each halogen bulb whereby each switch-mode power supply device is integrated in one of the following manners: integrated in the cap of each halogen bulb, or integrated in each connector.

2. A vehicle lighting system, wherein it comprises at least one device according to claim 1.

3. A system according to claim 2, further comprising means for activating a second lighting function for the at least one halogen bulb.

4. The lighting device according to claim 1, wherein the switch-mode power supply device further comprises a voltage regulator which supplies power to a fixed-frequency oscillator, the oscillator being connected to a first input of a first circuit which generates a pulse width modulation signal PWM, a duty factor of which depends on a setpoint applied to a second input of the first circuit by a second circuit, whereby the second circuit generates such a setpoint as a function of an image of an electrical quantity representative of the luminous flux of each halogen bulb produced by a third circuit for generating an image of the terminals of each halogen bulb.

5. The lighting device according to claim 4, wherein the second circuit comprises a sixth circuit which generates a reference voltage so as to take account of an instantaneous speed of a vehicle.

6. The lighting device according to claim 4, wherein the second circuit comprises a seventh circuit which generates a reference voltage so as to take account of the temperature of each bulb.

7. The lighting device according to claim 4, wherein the second circuit comprises an eighth circuit which generates a reference voltage so as to take account of the degree of ageing of each bulb.

8. The lighting device according to claim 4, wherein the flux-regulating means further comprises a fourth circuit for generating a reference voltage Vref which is a function of instantaneous supply voltage Val, a fifth circuit which generates a reference voltage for a secondary function, a sixth circuit which generates a reference voltage so as to take account of an instantaneous speed of a vehicle, a seventh circuit which generates a reference voltage so as to take account of the temperature of each bulb, and an eighth circuit which generates a reference voltage so as to take account of the degree of ageing of each bulb.

9. The lighting device according to claim 8, wherein a wave produced by the first circuit which generates a pulse width modulation signal PWM is transmitted to a control input of a switch-mode transistor circuit which is moreover connected to a power supply source, the voltage of the power supply source being switched in synchronism with the wave PWM applied to the control input of the switch-mode transistor circuit.

10. The lighting device according to claim 4, wherein the second circuit comprises a fourth circuit for generating a reference voltage Vref which is a given function of instantaneous supply voltage Val measured as close to each halogen bulb as possible.

11. The lighting device according to claim 4, wherein the second circuit comprises a fifth circuit which generates a reference voltage for implementing at least one secondary function.

12. The lighting device according to claim 11, wherein each secondary function is determined from the "AFS" functions for adapting a front lighting of a vehicle.

13. The lighting device according to claim 12, wherein the functions for adapting the front lighting of the vehicle are selected from one of the following functions:
- control of a dynamic dipped beam lighting mode during a turn;
- control of a fixed dipped beam lighting mode during a turn;
- control of a sidelights lighting mode;
- control of a full beam lighting mode;
- control of a high-mount light lighting mode;
- control of a bad weather lighting mode.

14. The lighting device according to claim 11, wherein each secondary function is based on a second mode of operation of each halogen bulb which is implemented by applying to each bulb at least one of a regulated and predetermined voltage, a regulated and predetermined current, and a regulated and predetermined current ripple.

15. A lighting device comprising:
at least one halogen bulb, wherein each halogen bulb includes a cap;
a connector for each halogen bulb, wherein the cap of each halogen bulb is mounted on each connector; and
a switch-mode power supply device for each halogen bulb, wherein each switch-mode power supply device is adapted to supply power to each halogen bulb and to regulate an output voltage from the switch-mode power supply device independent of a supply voltage to the switch-mode power supply device, each switch-mode power supply device comprises a regulating circuit for regulating the luminous flux from each halogen bulb, and each switch-mode power supply device is integrated in each cap so as to minimize electromagnetic interference and dispersion of the supply voltage at the terminals of each halogen bulb.

16. A lighting device comprising:

at least one halogen bulb;

at least one connecter on which each halogen bulb is mounted; and a switch-mode power supply device adapted to supply power to each halogen bulb and to regulate an output voltage from the switch-mode power supply device independent of a supply voltage to the switch-mode power supply device, said switch-mode power supply device comprising a regulating circuit for regulating the luminous flux from each halogen bulb, wherein said switch-mode power supply device is integrated in each connector so as to minimize electromagnetic interference and dispersion of the supply voltage at the terminals of each halogen bulb.

* * * * *